April 30, 1929.     J. C. LINCOLN     1,711,151
METHOD OF ELECTRIC ARC WELDING
Filed Sept. 19, 1918
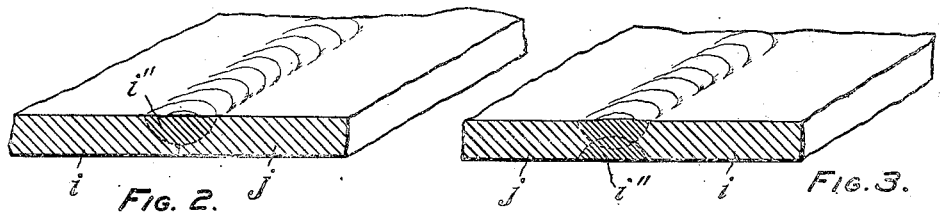
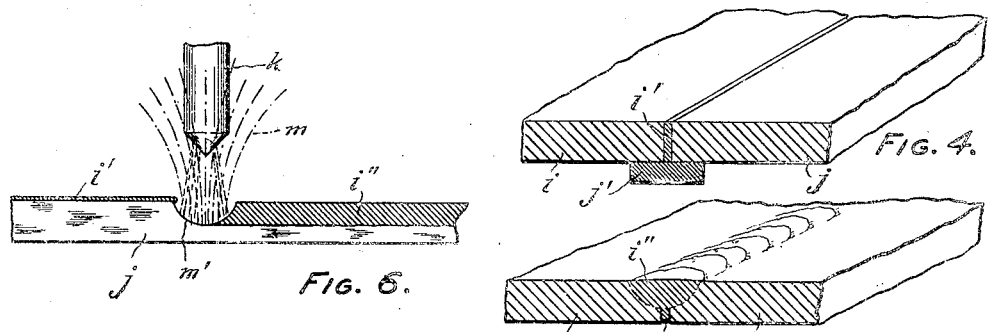
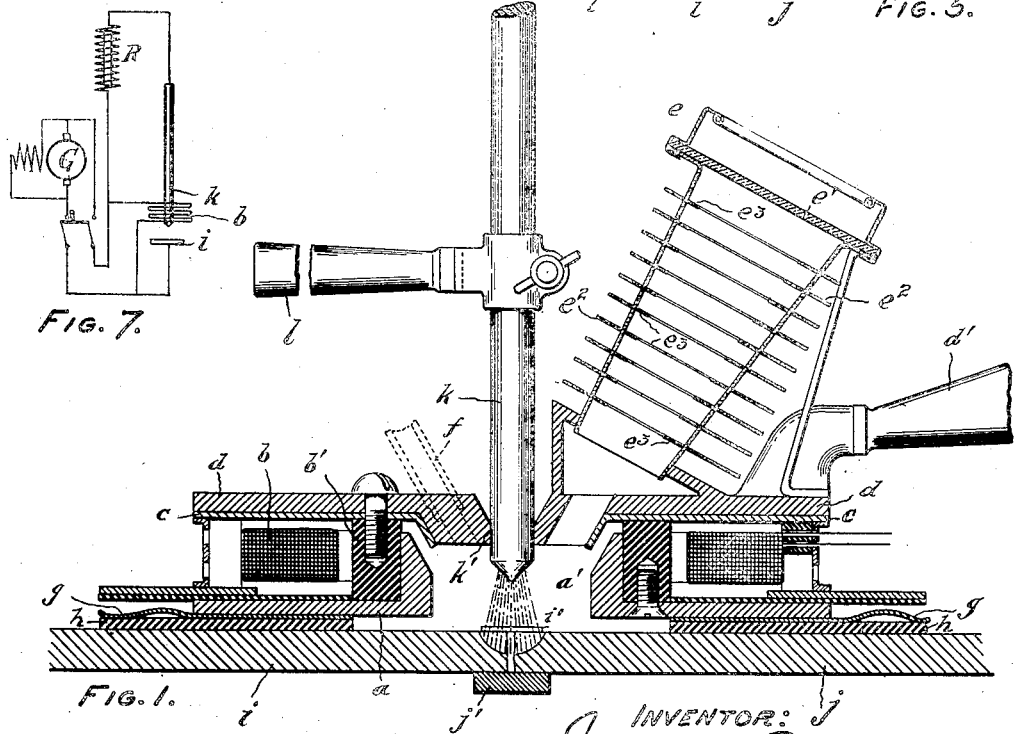
INVENTOR:
John C. Lincoln,
BY
ATTORNEY.

Patented Apr. 30, 1929.

1,711,151

UNITED STATES PATENT OFFICE.

JOHN C. LINCOLN, OF EAST CLEVELAND, OHIO.

METHOD OF ELECTRIC ARC WELDING.

Application filed September 19, 1918. Serial No. 254,773.

My invention relates to improvements in methods of welding, and has for its object the production of welds which will be ductile, as strong or stronger than the metal welded, economical in the cost of labor and current, as well as preferably avoiding the preparation of the surfaces or edges to be welded.

The typical welding operation of my invention proceeds under conditions of excluding any large component of air or oxygen from access to the molten metal during the welding operation and effectively directing the electric arc, controlling its action and observing the progress of the welding operation so that the arc may be advanced as required.

The control of the electric arc preferably is effected by means of a magnetic field, while the best welding conditions are secured by partially or effectively excluding the air from the arc and the metal while in molten condition, through the agency of an inert gaseous medium, forming a covering or envelope therefor. This gaseous medium may be produced by the arc itself or a supply of such gaseous medium, such as carbon-dioxide or nitrogen, may be maintained during welding operations.

It is well known that fairly satisfactory welds can be made upon steel plates by means of the oxy-acetylene flame or the electric arc. The principal objection to the work hitherto produced by either of these means is that the welds are lacking in the necessary ductility, while another objection is found in that said welds are not as strong as the metal plates thus united.

Moreover, an important item involving both expense and delay, has been present in the necessity for preparing the metal for welding. This preparation of sheet metal ordinarily has consisted in beveling the edges of the sheets of metal to be welded, so that the opposing or the substantially abutting surfaces would exhibit an angle approximately of 90°, in order to enable the electric arc to reach the bottom of the space thus afforded for the weld. It has been my purpose therefore, to devise a method for welding sheet metal and other metallic members, without any previous preparation of the edges thereof.

During my experiments, I have ascertained that a prime factor in obtaining ductility in a weld is the avoidance as far as commercially possible, of any oxidizing action of the air, which may be excluded by means of a gaseous medium, either under cover or in the open. In addition, it is essential to observe the progress of the welding operation, and highly desirable that the arc within its inert gaseous envelope, shall be steadied and directed by a concentric magnetic field.

For this purpose, I have devised a simple, portable device wherein the arc-forming electrode may be inserted and observed during its welding action, which device substantially excludes the atmospheric air, and being of small size, the oxygen initially contained therein almost immediately is consumed, so that the device contains only the inert nitrogen and products of the welding operation, such as iron vapor. The inert gas, however, may be supplied to the effective portion of an electric arc in the open, by suitable external means, such as from a cylinder of liquefied carbon-dioxide equipped with reducing and controlling valves, together with a pipe extending to the proximity of the arc.

To insure the steadying and directing magnetic field for the arc, there is provided an enclosing solenoid winding in substantially the plane of the arc, while an inductive resistance is interposed in the arc-forming circuit. Great difficulty has been experienced hitherto in the practice of arc-welding, particularly with the carbon electrode, by reason of the fact that the arc tends to jump from the material to be welded through the path of least resistance. The resistance of the path or the resistance of the arc is affected by the amount of vapor generated from the material being welded, and there is a tendency commonly observable for the arc to progress, jumping from point to point, instead of a substantially steady progress necessary to produce a uniform weld.

This irregular jumping tendency is due, no doubt, to the assumed fact that the arc tends to persist in a given spot because more vapor is thrown into the arc from the molten metal beneath the arc, than can be thrown into the arc from the cooler adjacent metal. Thus, the normal tendency of the arc is to persist in the spot which is already heated until the arc lengthens to such an extent that a lower resistance is encountered beneath a traveling carbon electrode, than is encountered by the persisting arc. The arc, accordingly, jumps from the former to the new position, simply to repeat the process, as the electrode is advanced along the weld. As a result, the weld, instead of being uniform, is inclined to become minutely flawed and uneven, and not well adapted for commercial use. In order to obviate this irregular and undesirable action of the electric arc, I have provided the means above indicated for steadying and directing the arc during welding operations. The prime factor thereof is a magnetic field of force in which the lines are substantially parallel to the desired direction of current flow in the arc, whereby said arc is "focused" and stabilized in its action.

It is well recognized that an electric arc in the presence of a magnetic field, tends to be deflected laterally with reference to the direction of the arc, and the direction of the magnetic lines of such field. However, if the direction of the magnetic lines is parallel to the direction of the arc, the magnetic field will exert no appreciable effect upon the arc. This being the case, it is clear that the magnetic lines passing from the material to be welded back to the magnet, will tend to blow out any component of the arc not in line with the axis of the electrode, and also will tend to make the arc itself more nearly a cylinder than a cone, as is normally the case. With this action, however, there is coupled the greater liability of blowing out the arc, and preferably the circuit is so arranged as to offset this.

Connected in series circuit with the arc, is a suitable inductive resistance so designed that the amount of the ohmic resistance shall be such as to give an arc of approximately thirty-five to forty volts, the amount of self-induction being sufficient to avoid frequent breaking of the arc. It is clear that with the use of inductive resistance, energy will be stored up in the inductance during the instant that the current is increasing from zero to normal, and this energy will be released at the arc in the guise of a momentary increase in voltage before the circuit can be broken. It is possible to design this inductive resistance so that any desired momentary increase of voltage is provided at the arc, necessary to make it substantially stable. For example, with a voltage of fifty-five volts in the external circuit and approximately forty volts across the arc, the loss in the solenoid winding or ohmic portion of the inductive resistance would be fifteen volts. By proper design of the inductive resistance, in a manner well known to those skilled in the art, the welding arc may be made as stable as it would be with a current of from one hundred to one hundred fifty volts provided across a non-inductive resistance.

By employing the method or methods above outlined, riveting may be avoided, and much of the work upon steel bridges, steel hulls for vessels, boilers, and the like may be performed with material gain of time and at a very much lower cost than is possible with riveting. In addition, the weld may be made stronger than the original metal welded, while the riveted joint has a strength at best of from 65% to 85% of that of the members thus united.

An advantage of distinct practical importance in arc-welding in accordance with the improvements here disclosed, is that the arc always is enclosed within a protective chamber, which shields the eyes of the operative and other by-standers from the intense rays of light resulting therefrom. The operative thus is able to dispense with the usual dark glass helmet and may observe the welding operation with equal facility, while able as well, to give casual attention to his surroundings.

The method herein described and explained in connection with simple means for practicing the same, obviously is not limited in its practice, to the means set forth, nor to the exact details of procedure which are herein outlined. I may refer to the accompanying drawings, further to explain my improvements, wherein :—

Fig. 1 is a cross-sectional view of apparatus, including a protective chamber and means for viewing the arc, adapted for practicing the method or methods of my invention.

Figs. 2 and 3, respectively, are fragmentary views of sheet metal plates, partially and completely welded in accordance with my invention.

Figs. 4 and 5 are similar fragmentary views of sheet metal plates designed for welding in accordance with further improvements of my invention.

Fig. 6 is a view, partially diagrammatic in character, by which I have endeavored to show the action of welding as controlled by the magnetic field, and Fig. 7 is a diagram illustrating the apparatus used.

Throughout the several figures, I have employed the same character of reference to indicate similar parts or members.

A simple type of apparatus for practicing my invention, is shown in the drawings. This comprises essentially a hand-controlled closed chamber for the arc and molten metal adapted to exclude the air therefrom, with which are associated a solenoid winding and means for viewing the action of the arc.

The flat base-plate $a$ is constructed from copper, upon which are mounted the vulcabeston insulation $b'$, (compressed and vulcanized asbestos fiber), the annular core $c$ and exciting winding $b$ of the stabilizing electromagnet. An upper copper plate $d$ has a handle $d'$ at one side, and the vision appliance $e$ positioned at an angle above the opening into the central protective chamber $a'$. This chamber preferably is of restricted volume in order to limit the amount of air initially present therein and to retain in quiescent state, the resultant protective gaseous envelope. If desired, a tube f, shown in dotted lines, may also communicate with said chamber, for introducing a limited, continuous or regulated supply of inert gas, sufficient to drive out or exclude the air completely. Ordinarily, this is not necessary, however.

As a mechanical means for further excluding the air, the plate a is equipped along its bottom face with sets of peripheral springfingers g bearing upon a flexible continuous packing of asbestos cloth h which is pressed closely against the surface of the sheet metal members i j undergoing the welding operation. In addition, the electrode k is closely fitted within the thimble k', substantially to shut off the entrance of air. The electrode k, which forms the negative terminal of the arc, may be of carbon or metal and of an alloy such as will give the desired characteristics to the weld. Said electrode k is equipped with a handle l, by which it may be manipulated by the operative during the welding operations or controlled in any other suitable manner. It is necessary only, that the electrode shall at all times be in view of and under the control of the operative for directing and regulating the welding action of the arc. In order properly to accomplish this, the vision appliance is equipped with a dark glass e', with outer radiator-plates $e^2$ to dissipate the heat and with interior deposit ledges $e^3$ for catching the small amount of oxide formed during the welding operation and preventing its filming over the underside of the glass. Thus the action of the arc may be constantly observed and regulated by the operative.

This simple welding device is assumed to be progressively moved away from the observer, in the direction or along the line of the opposing edges of the sheet metal plates i j, shown in Fig. 1, as the welding operation proceeds.

These plates may merely be placed in substantial abutment as also shown in fragmentary form Fig. 2, or they may be somewhat separated as in Fig. 4, while optionally, a flat wire or welding strip of alloy i', such as nickel-steel, manganese-steel and the like, may be placed upon or interposed therebetween to form part of the welded seam.

In the diagram, Fig. 7, the generator G is shown connected through the inductive resistance R with the welding arc k, i, and also with the magnet windings b, adapted for stabilizing the arc.

Preferably the plates i j need not be specially prepared for welding, but are disposed with their edges in abutment, or in opposition to each other. The arc is then struck and progressively advanced along the seam as rapidly as the welding is accomplished. A weld, either slightly in excess of one-half the thickness of the plates or sheets, may thus be perfected as in Fig. 2, or it may proceed the entire thickness thereof, with the use of a backing or bridging strip j' as in Fig. 1, which strip accordingly becomes a part of the welded seam as the arc reaches and fuses its exposed section. To complete the weld of Fig. 2, the arc is then progressively applied to the opposite sides of the sheets which are thus fused or welded into a seam formed of intersecting welds, each slightly in excess of one-half the thickness of the sheets, as shown in Fig. 3. Any losses of metal or added metal may be supplied by the wire or strip i', as desired. If a welding strip is employed either of steel or alloy, or if alloy electrode is used, of course these metals will contribute to the body and characteristics of the welded seam.

In Fig. 6, I have endeavored somewhat diagrammatically to show the action of the welding arc in forming the partial seam i'' of Fig. 2 in accordance with my invention. The electrode k is pictured with the arc drawn from the steel j, and in the process of welding, there results a marked depression m', which presumably is due to the boiling out of the molten metal under the heat of the electric arc. The progress of the arc is assumed to be from right to left. Therefore, as the welding proceeds, the metal is melted from the left side of the depression under the intense action of the arc, and actually transferred to the right side thereof, where it is solidified. A somewhat violent agitation of the molten metal takes place beneath the arc, so that with the addition of any alloying material, a fairly uniform, ductile alloyed seam results.

It will be recognized that any contained air within the chamber a' will be exhausted of its oxygen content almost immediately and with careful use of the welding device, only a negligible quantity of air thereafter will find entrance to said chamber. Consequently, the welding operation takes place in an atmosphere of nitrogen with some generated iron vapors, and also carbon monoxide and carbon dioxide when the carbon electrode is used, hence no oxidizing action can take place and the weld is clean and ductile.

Should the surface be rough or slightly uneven, of course the mechanical means shown will not exclude the air as effectively as above recited. In these circumstances, an external supply of an inert gas, as from a cylinder of carbon-dioxide, may with advantage be introduced to chamber a' through the pipe f, in sufficient volumes to drive out and prevent the entrance of air.

Referring once more to Fig. 6, I have endeavored to indicate by the dotted parallel lines m, the magnetic lines of force wherein the arc is enclosed and focused during the excitation of the windings b. These serve to converge somewhat or render more truly cylindrical, the normally frusto-conical shape of the arc, and by their concentric directive effect, materially stabilize the welding action of the electric arc, while the continuity of such arc is contributed to by the inductance R, as already explained.

This concentric annular magnetic field, as will be better appreciated by considering Fig. 1, is strongest in the region of the side walls of the opening through the base plate *a* and is weakest in the center, or the axis of the electrode *k*. Such magnetic field thus has a directive component at right angles to every direction of current-flow in the arc, except to the one desired, as opposed to the dispersive action of a field intensified in the axis of the arc.

This method of welding, wherein the electric arc is enclosed within a magnetic field and the arc and molten metal within a relatively quiescent envelope of inert gas, may be more rapidly and economically practiced than can any method known to the art.

Having now described the preferred method of practicing my invention, I claim as new and desire to secure by Letters Patent the following:—

1. The method of arc-welding, which consists in placing an air-excluding member over the work, striking an electric arc, and progressively advancing said arc and member as the welding proceeds, substantially as set forth.

2. The method of arc-welding, which consists in placing an air-excluding member over the metal to be welded, striking the arc therewith, observing the welding action of the arc, and advancing said arc and air-excluding member as the welding is accomplished, substantially as set forth.

3. The method of arc-welding, which consists in positioning a portable air-excluding cover about the arc, striking the arc with the metal to be welded, observing the welding action of the arc, and advancing said arc and cover, as the welding operation proceeds, substantially as set forth.

4. The method of arc-welding, which consists in positioning a portable air-excluding cover of restricted interior capacity upon the metal to be welded, striking the arc therein, observing its progressive welding action, and advancing the arc and cover along the metal as the welding action progresses, substantially as set forth.

In testimony whereof I do now affix my signature.

JOHN C. LINCOLN.